US006952059B1

(12) United States Patent
Louvel et al.

(10) Patent No.: US 6,952,059 B1
(45) Date of Patent: Oct. 4, 2005

(54) SYSTEM AND METHOD FOR LOCKING A VEHICLE STEERING

(75) Inventors: Philippe Louvel, Le Plessis-Robinson (FR); Patrick Poulain, Les Essarts le Roi (FR); Eric Moizan, Le Chesnay (FR); Jacques Morillon, Massy (FR); Patricia Moreau, Paris (FR)

(73) Assignee: Renault-Valeo Securite Habitacle, Creteil (FR)

( * ) Notice: Subject to any disclaimer, the term of this patent is extended or adjusted under 35 U.S.C. 154(b) by 235 days.

(21) Appl. No.: 10/048,251

(22) PCT Filed: Jul. 21, 2000

(86) PCT No.: PCT/FR00/02114

§ 371 (c)(1),
(2), (4) Date: Dec. 27, 2002

(87) PCT Pub. No.: WO01/07301

PCT Pub. Date: Feb. 1, 2001

(30) Foreign Application Priority Data

Jul. 28, 1999 (FR) .................................. 99 09816

(51) Int. Cl.[7] ................................................ B60L 1/00
(52) U.S. Cl. ...................................... 307/9.1; 307/10.1
(58) Field of Search ................................ 307/9.1, 10.1; 70/252

(56) References Cited

U.S. PATENT DOCUMENTS 5,841,363 A * 11/1998 Jakob et al. ............... 340/5.26
5,856,976 A * 1/1999 Hirano ........................ 370/401
5,949,151 A * 9/1999 Nakajima .................. 307/10.3
6,298,938 B1 * 10/2001 Klaiber et al. .............. 180/287

* cited by examiner

*Primary Examiner*—Robert L. DeBeradinis
(74) *Attorney, Agent, or Firm*—Allen, Dyer, Doppelt, Milbrath & Gilchrist, P.A.

(57) ABSTRACT

A system and method for locking a motor vehicle steering column to prevent accidental locking of the steering column is provided. The system electro-mechanically locks the steering column in rotation using a bolt driven by an electronic control circuit that receives commands from an electronic calculator via a multiplexed bus. A blocking device mechanically blocks displacement of the bolt.

19 Claims, 4 Drawing Sheets

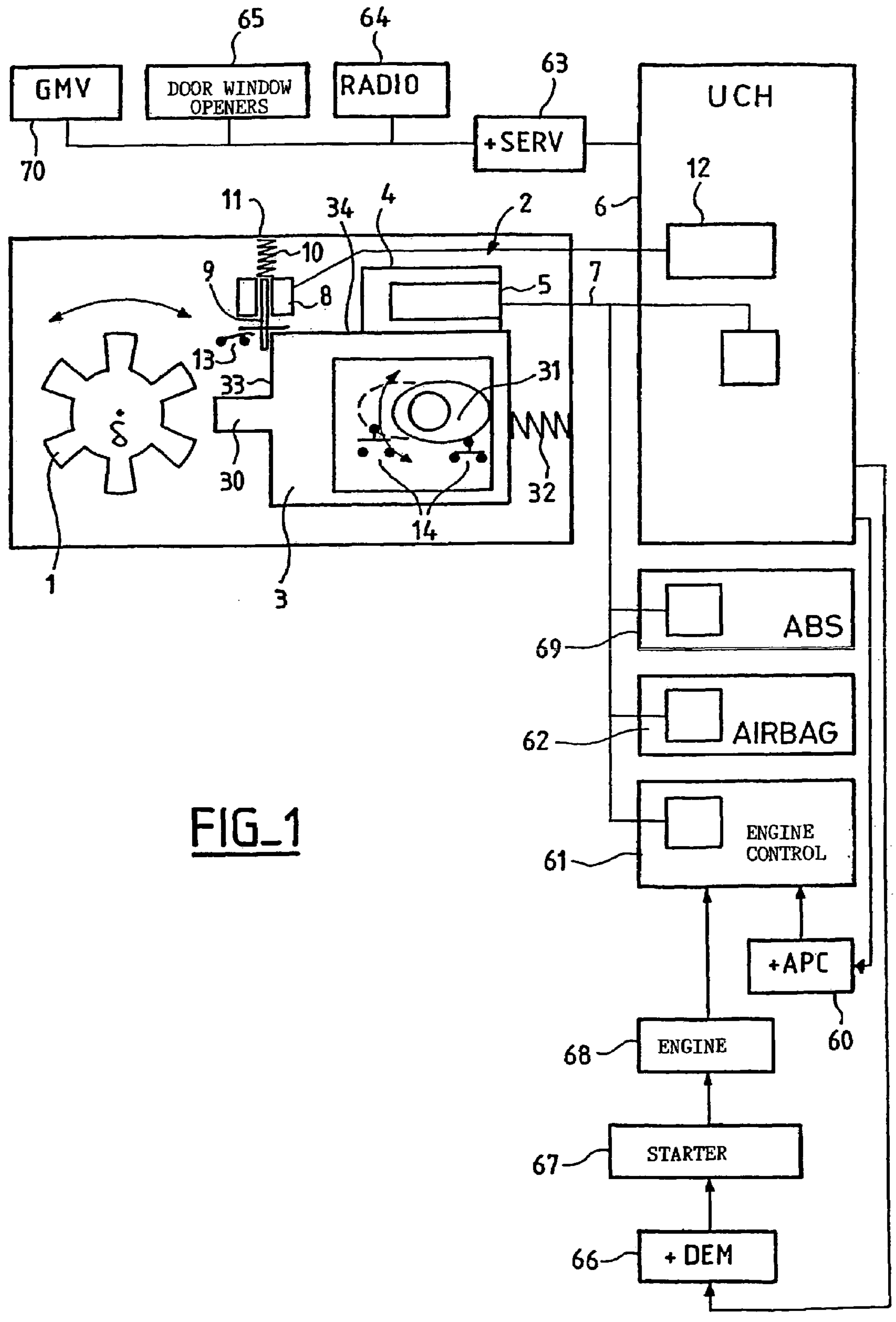
FIG_1

FIG_2
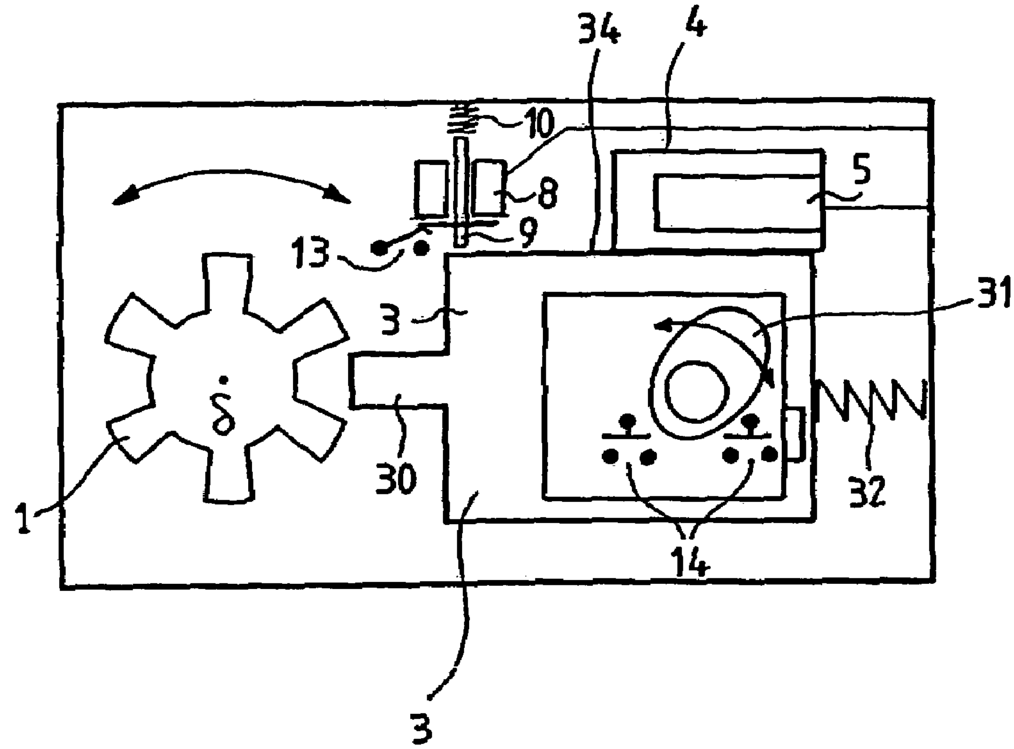
FIG_3
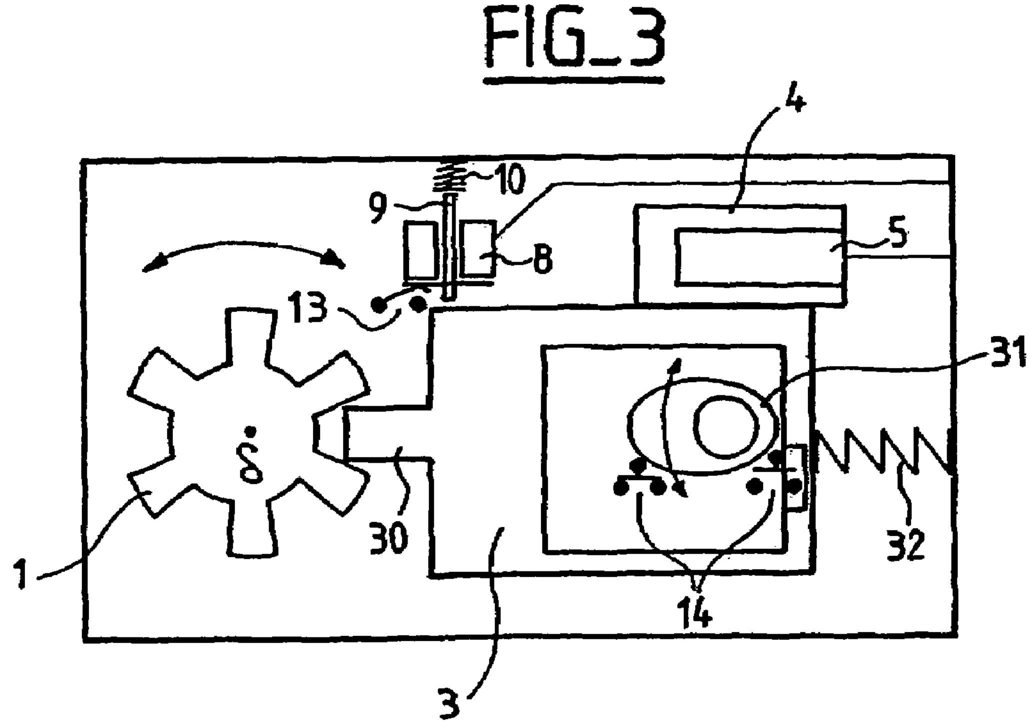

FIG_4
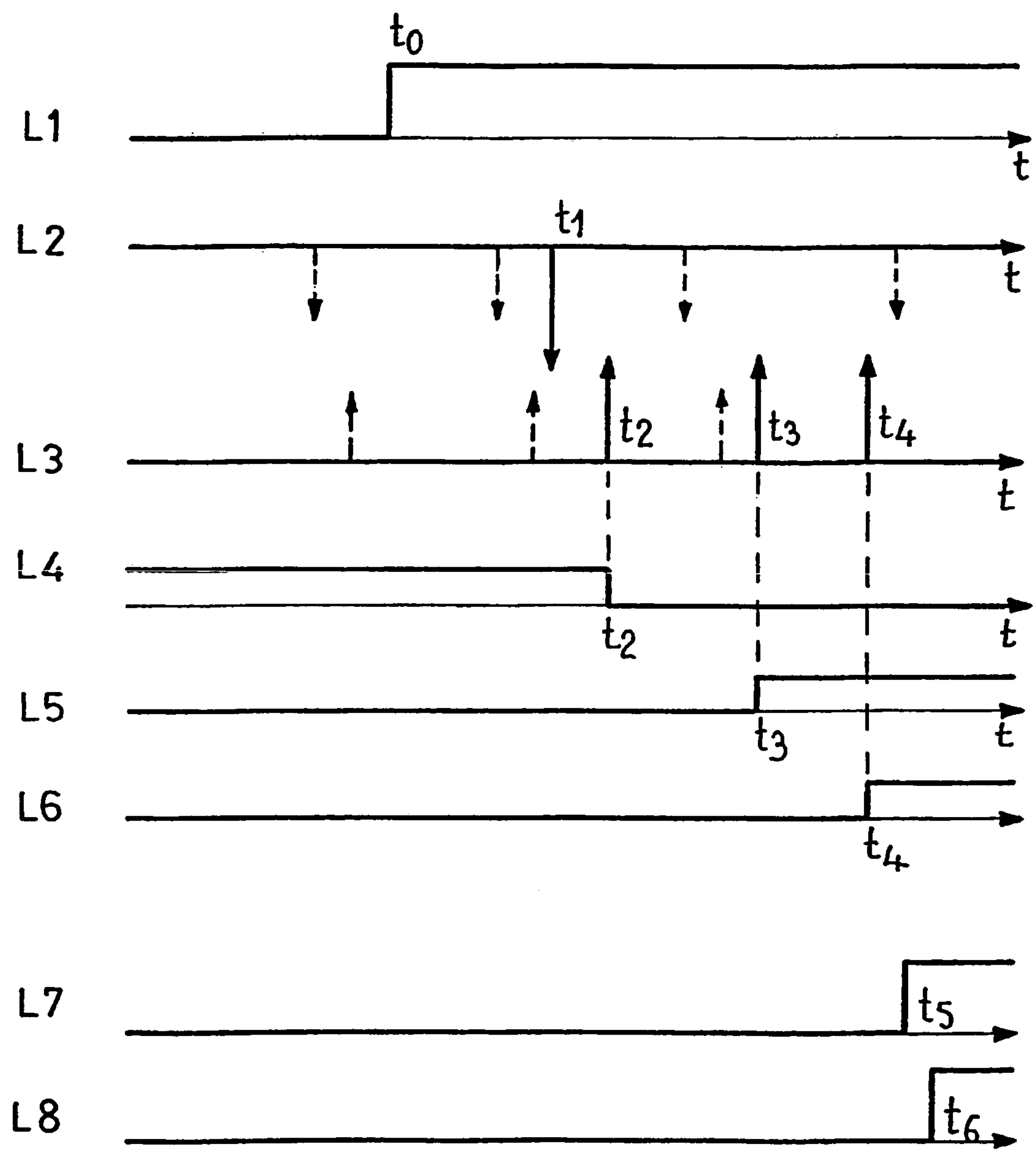

FIG_5
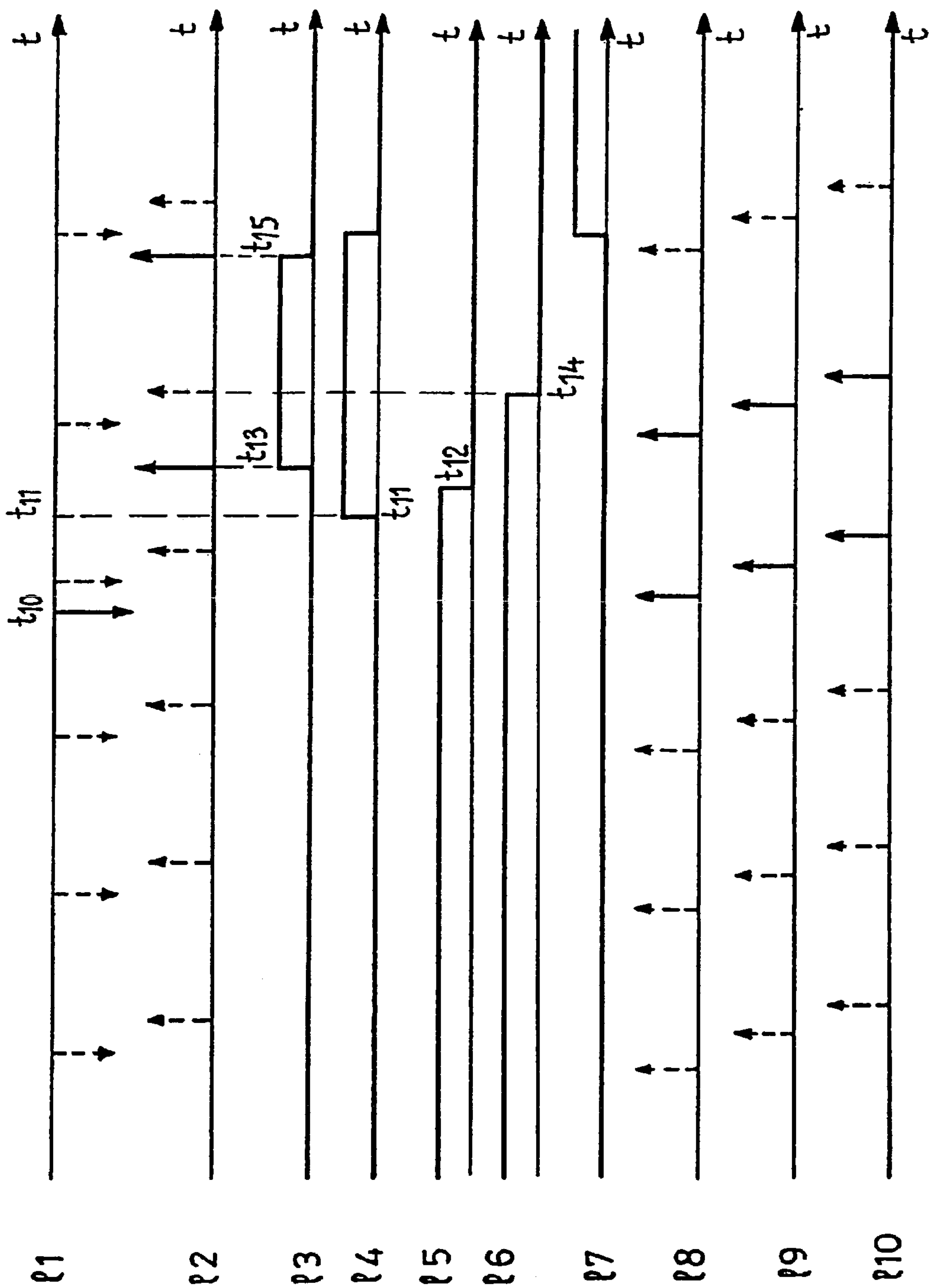

SYSTEM AND METHOD FOR LOCKING A VEHICLE STEERING

FIELD OF THE INVENTION

The invention relates to motor vehicle steering devices, and, more particularly, to locking a motor vehicle steering column.

BACKGROUND OF THE INVENTION

A locking device for locking the steering column of a vehicle is a standard feature on virtually all modern automobiles. For safety reasons, it is important that a vehicle's steering column locking device operate so that in the event of a simple failure, be it software or material, the device under no circumstances will cause an accidental locking of the steering column while the vehicle is in motion. Systems are therefore designed as a safety feature to prevent the unintended locking of the steering column.

Conventional systems for preventing unwanted locking of a steering column use two electronic microcontrollers operating in tandem. The microcontrollers monitor each other so as to prevent electrical, software, mechanical or other failures from causing an accidental locking of the steering column. Such a solution is described in European Patent No. 496,509 A1 filed in the name of Lucas Industries Public Limited Company in connection with an electronic calculator for an ABS wheel anti-locking system.

The main drawback of such a system, however, is its high cost. Not only must the microcontroller be duplicated, but also its clock and reset circuit. Accordingly, there is the need for a system that can effectively prevent the unwanted locking of a steering column, but that is more efficient than conventional systems.

SUMMARY OF THE INVENTION

An object of the invention is to overcome this drawback by proposing a steering lock whose operation is made secure by a blocking device and blocking means as such when the steering column must be in the unlocked position, notably during motion.

To this end, the invention provides a system for locking a vehicle steering column, comprising a locking device or means for locking electromechanically in rotation the steering column using a bolt, and which is driven by an electronic control circuit receiving commands from an electronic calculator via a multiplexed bus. The system further comprises blocking means or a blocking device for blocking the displacement of the bolt when the steering is in the unlocked position. The blocking device may be driven by the electronic calculator by a drive transistor. The system may also include a sensor for the position of the blocking means, a double sensor for the position of the bolt, and an electronic control circuit for controlling the means for locking the steering column. The electronic control circuit may comprise a microcontroller which receives on the one hand information on the position of the blocking means and on the other hand information on the vehicle speed, on the state of the engine, and/or on the detection of an impact via the multiplexed bus.

According to another aspect of the invention, the means for mechanically blocking the bolt for locking the steering may include a soft iron core arranged to be displaceable perpendicular to the direction of displacement of the bolt, and under the effect of the magnetic field created inside a solenoid passed through by a variable current.

Another object of the invention is a method of operating the above system for locking a vehicle steering. The method may comprise the following steps for unlocking and locking the steering. For unlocking the steering, the method may include after identifying the driver, sending a steering unlocking command on the multiplexed bus by the electronic calculator, reading this command by the microcontroller for the locking means with immediate execution, and monitoring changes of state on the information delivered by the sensors for the position of the bolt and the blocking means in view of an eventual start of the vehicle engine. For locking the steering, the method may include sending a locking command on the multiplexed bus by the electronic calculator, reading the command by the microcontroller for the locking means, after a time delay, sending by the drive transistor of the electronic calculator a command to unlock the bolt by the blocking means, checking safety conditions by the microcontroller for the locking means, and commanding, by the microcontroller for the locking means, the blocking of the steering by the bolt.

BRIEF DESCRIPTION OF THE DRAWINGS

Some of the objects and advantages of the present invention having been stated, other characteristics and advantages of the invention shall become more apparent as the following description of a steering locking system proceeds when taken in conjunction with the accompanying drawings, in which:

FIG. 1 is a functional diagram of a complete vehicle steering column lock device in accordance with the invention, shown in the unlocked position;

FIG. 2 is functional diagram of steering lock means made secure by blocking means, respectively in intermediate and locked positions;

FIG. 3 is functional diagram of steering lock means made secure by blocking means, respectively in intermediate and locked positions;

FIG. 4 is a timing chart of a vehicle steering unlocking procedure; and

FIG. 5 is a timing chart of a vehicle steering locking procedure.

The elements identified by like references in the different figures have the same functions in view of the same results.

DETAILED DESCRIPTION OF THE PREFERRED EMBODIMENTS

The vehicle steering column locking system in accordance with the invention comprises electromechanical means for preventing steering rotation while the vehicle is stationary, with the engine stopped under normal conditions. These locking means are essentially formed by a movable part provided with a bolt that enters into engagement with a toothed wheel of the steering column to prevent it from turning. However, this movement of the bolt to its steering column locking position should never occur outside well-defined and strict conditions. To this end, the invention includes means for mechanically blocking the bolt when the latter must imperatively leave the steering free in rotation to make the system secure.

According to the functional diagram of FIG. 1, the steering column 1 must be able to turn freely around its axis of rotation δ, perpendicular to the plane of the drawing, in the unlocked position. Locking means 2 comprise notably a mechanical part 3 equipped with a bolt 30 and movable in a direction which is orthogonal to the steering column's axis of rotation δ in response to a rotational movement of an eccentric member 31. A spring 32 is provided to push the part 3 so that the bolt 30 prevents this rotation when the means 2 receive the order to do so. To this end, the locking means 2 are driven by a control circuit 4 having an electronic microcontroller 5 which receives commands from an electronic calculator 6 of the vehicle, via a CAN-type multiplexed bus 7.

This calculator 6 can be a central unit for controlling the passenger compartment, ensuring electrical power supply distribution by three relays. A first relay 60 is for controlling the motor electrical power circuit, referred to as the after-contact relay "+APC", supplying among others the engine control unit 61, the air bag 62, and the dashboard. A second, service relay 63 "+SERV" is for the power supply notably to the radio 64, the window openers 65, the passenger compartment motor ventilator unit GMV, etc. (It additionally supplies the electrical anti-theft device formed by the steering lock system). A third, starter relay 66 "+DEM" is for supplying the starter motor 67 of the engine 68. (The motor control unit 61 communicates to the passenger compartment control unit information concerning the state of the engine, which is stopped or running).

To make the steering lock system secure, the invention adds to the locking means for mechanically blocking its displacement when it must allow the column to rotate freely. These means are formed by a magnetic core 9 placed at the center of a solenoid 8, the core being movable under the effect of a magnetic field created by a current circulating in the coil and biased to its stable equilibrium position by a spring 10, whose end 11 opposite the core 9 is fixed. The current in the coil 8 is driven by the passenger compartment central unit 6 via a drive transistor 12 located within the central unit itself.

In the rest state, without any current in the coil 8, the magnetic core 9 is only subjected to the spring 10 which places it such that it projects considerably from the coil. To block the bolt 30, the blocking means must be positioned such that the core is placed just in front of the mechanical part 3, along its face 33 perpendicular to the displacement direction of the bolt 30. When the central unit 6 commands the current in the coil 8, the magnetic core 9 is displaced such that it is retracted into the solenoid to leave the bolt free for displacement to the steering column 1. Then the current is cut off and the core 9 is retained by the face 34 of the mechanical part 3 parallel to the displacement direction of the bolt.

The locking system according to the invention also comprises a sensor 13 for the position of the blocking means, for delivering information concerning the stable position of the magnetic core 9, and hence projecting from the coil 8, to render secure the unlocked position of the steering. The system also comprises a dual sensor 14 for the position of the bolt, for delivering firstly information on the activated, or readied, position of the bolt 3 which blocks the steering column 1 and secondly information on the retracted position which leaves the steering column free to rotate.

The control circuit 4 for the locking means 2 comprises an electronic microcontroller 5 which receives both position information concerning the bolt 3 and concerning the core 9 from their respective sensors 14 and 13, and information vital for defining the safety conditions, from the different microcontrollers via the multiplexed bus 7. The latter information are the vehicle speed, the engine's operating state and the detection of an impact.

Indeed, in accordance with the invention, the control circuit 4 for the locking means 2 of the steering column, before authorizing a locking requested by the passenger compartment central unit 6, checks the following information reaching it via the multiplexed bus, and independently of the information which the central processing unit itself sends. The information includes that the vehicle speed exists and is of zero value, which is information delivered by the microcontroller for the wheel anti-lock braking system ABS 69, or by a wheel speed sensor located in the transmission; that the engine is not turning, which is information delivered by the engine control calculator 61; and that no accident, impact or fault has occurred to trigger the protection means, which is information sent by the airbag microcontroller 62.

If all the required safety conditions are fulfilled, the microcontroller 5 for the steering locking means 4 waits for the locking means to cease blocking the bolt 30, hence for the magnetic core 9 to be retracted in the coil 8, to authorize the command of the bolt (FIG. 2). The bolt 30 is then pushed by the spring 32 by a rotational movement of an eccentric member 31 which frees the bolt to the locked position of the steering column 1 (FIG. 3).

Accordingly, if the passenger compartment central unit 6 were to send by error an order to lock the steering column to the bolt locking means, this order would not be executed, except if the above-mentioned safety conditions were fulfilled for the driver, i.e. zero speed for the vehicle, engine stopped, no air bag incident and no accident. By virtue of the architecture of the system according to the invention, a code-error type of software failure can never lead to the steering column being blocked during motion. Likewise, a simple electrical failure cannot cause the steering to block either. Accordingly, if there were to occur e.g. a short-circuit within the circuit controlling the eccentric, and this short-circuit were such as to command to lock, then the readying could not take place as the core 9 prevents translation of part 3. Likewise, if there were to occur a short circuit in the cabling, and this short circuit were such as to command the solenoid 8 unintentionally, then, there would be no displacement of the bolt 30 because the command of the eccentric is independent and internal to the locking system.

A second object of the invention is to provide a method of locking the steering column implementing the above-described system, which comprises different steps during the phase of unlocking the steering on the one hand (FIG. 4), and the phase of locking on the other (FIG. 5). In the unlocking phase, e.g. when the driver enters his/her vehicle to start it, he/she enters a personalized code serving to identify him/her. After the identification, at the instant to, the passenger compartment central unit 6 sends a command to unlock the steering on the multiplexed bus 7, at instant $t_1$.

This command is then read at instant $t_2$ by the microcontroller 5 for the locking means 4 and immediately executed if the identification code is recognized. The eccentric 31 rotates by half a turn and displaces the bolt 30 which unlocks the steering column. The bolt thus passes from the steering column locking position, holding the core 9 in the coil 8, to the unlocked position, freeing the core outside the coil, which is kept away by the spring. It secures the unlocked position of the bolt, which is blocked in the retracted position and can no longer be readied at the instant $t_4$.

The respective positions of the bolt 30 and of the core 9 are then sent by the respective sensors 14 and 13 to the microcontroller 5 sending them on the multiplexed bus 7 to the passenger compartment central unit 6, which monitors changes of state in this information concerning the retracted bolt and the blocking means engaged in view of an eventual starting of the engine. This follows from the fact that there must be a transition in these two types of information attesting that the steering is indeed released for the central unit to authorize starting.

FIG. 4 is a timing chart showing the states of the different elements of the locking system according to the invention. In the unlocking phase, the first line L1 on top of the chart represents the driver identification information, which passes from the 0 to the 1 state when the latter is correctly recognized at instant $t_0$. The second line L2 represents the commands sent by the passenger compartment central unit 6 to the steering locking means microcontroller, i.e. the order to unlock at instant $t_1$. The third line L3 represents the information the locking means microcontroller sends via the bus to the passenger compartment central unit, i.e. the execution of the unlocking command at instant $t_2$, the change of state of the core's position being detected by sensor 13 at instant $t_3$ and the blocking of the bolt retracted at instant $t_4$. The arrows in dotted lines represent periodic messages sent on the multiplexing bus.

The fourth L4 and sixth L6 lines represent the change of state of the bolt, detected by the position double sensor, which passes, for the "readied" position, from state 1 to state 0 at instant $t_2$ and which passes, for the "retracted" position from state 0 to 1 at instant $t_4$. The fifth line L5 represents the change of state of the magnetic core for blocking the bolt, which passes to the 0 state, corresponding to its position retracted in the coil passed through by a current, to state 1 corresponding to its projected position mechanically blocking the bolt, at instant $t_3$. At instant $t_5$, relay "+APC" for the electrical ignition switch of the vehicle is activated (seventh line L7) and at instant $t_6$ the passenger compartment central unit authorizes the starting of the engine (eighth line L8).

In the steering column locking phase, when the driver wishes, for example, to leave to his/her vehicle, the passenger compartment central unit 6 sends a locking command at instant $t_{10}$ to the locking means, via the bus. The first line $l_1$ of the timing chart 5 represents the frames sent by the central unit 6 to the locking means. The second line $l_2$ represents the information that the microcontroller for the locking means sends by the bus to the passenger compartment central unit. The arrows in dotted lines correspond to periodic messages sent on the bus.

When the steering column is still unlocked, the bolt 30 is retracted. The position sensor hence shows an information at state 1 on the sixth line $l_6$ and an information at state 0 on the seventh line $l_7$ corresponding to a "readied" state, and the magnetic core 9 is projected to block it. Hence the coil 8 is not passed through by a current and its command by the passenger compartment central unit 6 is at the 0 state (fourth line $l_4$).

From the instant $t_{10}$, the microcontroller for the steering locking means reads this command and waits for the core to be retracted, freeing the bolt at the instant $t_{11}$ upon a command from the passenger compartment central unit, after a time delay on the order of 100 ms, for example, after the locking command. During this time delay, the microcontroller for the locking means carries out safety checks, i.e. it reads the frames sent by the calculator of the ABS system (eighth line $l_8$), by the engine control calculator (ninth line $l_9$) and the one for the airbag (tenth line $l_{10}$). If the required safety conditions are effectively fulfilled, and the change of state on the position of the core blocking the bolt is detected, at the instant $t_{12}$ according to the information from the position sensor (fifth line $l_5$), the microcontroller commands the readying of the latch at the instant $t_{13}$ and sends a frame via the bus.

As from that instant $t_{13}$ of locking the steering column, the command for the eccentric to project the bolt passes from the 0 state to the 1 state (third line $l_3$), the command for the core is at state 1, its "projected" position is at state 0, the bolt goes from the "retracted" position up till $t_{14}$ to the "readied" position at instant $t_{15}$ under the command of the eccentric. At that instant, the eccentric no longer needs to be commanded since the bolt blocks the steering column, therefore the state of its command returns to 0. Likewise, the core being raised, the passenger compartment central unit no longer needs to command a current in the coil which returns to state 0 (fourth line $l_4$) since the core is mechanically blocked by the surface 34 of mechanical part 3.

The bolt blocking means, formed of the solenoid whose core comes to block the bolt when the latter is retracted, in a locking phase of the steering, are managed by the passenger compartment central unit. To authorize the readying of the steering lock, the central unit electrically excites the coil to unlock the steering. The core is not electrically driven but simply submitted to the action of the spring which maintains it away from the coil, in order to ensure the safety of the unlocked position of the bolt.

By virtue of the locking system according to the invention, the movement of the bolt to lock the steering column is only authorized when locking means receive the order from the passenger compartment central unit. By contrast, when the steering column is to be unlocked, in particular when the engine is turning and the vehicle is in motion, the bolt cannot physically leave its retracted position since the blocking means physically stop it from being readied, without themselves having to be electrically controlled. This system thus ensures excellent safety.

Moreover, this approach has the advantage of using calculators or microcontrollers existing in the vehicle, as well as the multiplexed bus, which reduces the costs of the drive circuits for the locking means, while ensuring a very high level of safety.

What is claimed is:

1. A system for a vehicle steering column in a vehicle comprising a multiplexed bus and an electronic calculator connected thereto, the system comprising:

a locking device comprising a movable bolt and an electronic control circuit connected thereto for electromechanically locking rotation of the steering column based upon commands received from the electronic calculator;

a blocking device for mechanically blocking displacement of said bolt when the steering column is in an unlocked position and based upon commands from the electronic calculator;

a blocking sensor for sensing a position of said blocking device; and a bolt sensor for sensing a position of said bolt;

said electronic control circuit for controlling said locking device based upon said blocking and bolt sensors and information received from the multiplexed bus.

2. A system according to claim 1, wherein said electronic control circuit comprises a microcontroller.

3. A system according to claim 1, wherein said bolt sensor comprises a double sensor.

4. A system according to claim 1, wherein the vehicle also comprises a speed sensor, an anti-lock brake system unit, an engine control unit, and an airbag control unit all connected to the multiplexed bus; and wherein the information received from the multiplexed bus by said electronic control circuit comprises information on vehicle speed from at least one of the speed sensor and the anti-lock brake system unit, a state of the engine from the engine control unit, and on detection of an impact from the airbag control unit.

5. A system according to claim 1, wherein said locking device comprises a mechanical part carrying said bolt; wherein said blocking device comprises a solenoid coil and a core movable therein; wherein in a steering unlocking phase, the core is in a stable equilibrium position with no current in the solenoid coil and is biased in front of the mechanical part to block displacement of said bolt; and wherein in a steering locking phase, the core retracts based on current in the solenoid coil to free displacement of said bolt towards the steering column and the core is retained mechanically by the mechanical part even with no current in the solenoid coil.

6. A system according to claim 5, wherein the electronic calculator comprises a central control unit of a vehicle passenger compartment; and wherein the electronic calculator controls current in the solenoid coil.

7. A system for a vehicle steering column comprising:

a locking device comprising a movable bolt and an electronic control circuit connected thereto for locking rotation of the steering column;

a blocking device for blocking displacement of said bolt when the steering column is in an unlocked position; and a blocking sensor for sensing a position of said blocking device;

said electronic control circuit for controlling said locking device based upon said blocking sensor.

8. A system according to claim 7, wherein said electronic control circuit comprises a microcontroller.

9. A system according to claim 7, further comprising a bolt sensor; and wherein said electronic control circuit controls said locking device also based on said bolt sensor.

10. A system according to claim 9, wherein said bolt sensor comprises a double sensor.

11. A system according to claim 7, wherein the vehicle comprises a multiplexed bus; and wherein said electronic control circuit further controls said locking device based on information received from the multiplexed bus.

12. A system according to claim 11, wherein the information comprises at least one of information on vehicle speed, a state of the engine, and on detection of an impact.

13. A system according to claim 7, wherein said locking device comprises a mechanical part carrying said bolt; wherein said blocking device comprises a solenoid coil and a core movable therein; wherein in a steering unlocking phase, the core is in a stable equilibrium position with no current in the solenoid coil and is biased in front of the mechanical part to block displacement of said bolt; and wherein in a steering locking phase, the core retracts based on current in the solenoid coil to free displacement of said bolt towards the steering column and the core is retained mechanically by the mechanical part even with no current in the solenoid coil.

14. A method of operating a system for locking a vehicle steering column, comprising:

a) for unlocking the steering:

after identifying a driver, sending a steering unlocking command on a multiplexed bus by an electronic calculator, reading the unlocking command by a microcontroller of an locking device to displace a bolt which unlocks the steering column and to free a blocking device, and monitoring information delivered by sensors for the position of the bolt and the blocking device for an eventual start of a vehicle engine, b) for locking the steering:

sending a locking command on the multiplexed bus by the electronic calculator, reading the locking command by the microcontroller of the locking device, after a time delay, sending by the electronic calculator a command to unlock the bolt by the blocking device, checking predetermined conditions by the microcontroller for the locking device, and commanding, by the microcontroller for the locking device, blocking of the steering column by the bolt.

15. A method for operating a locking device for a vehicle steering column, the locking device comprising a movable bolt and an electronic control circuit connected thereto, the method comprising:

providing a blocking device for blocking displacement of the bolt when the steering column is in an unlocked position;

sensing a position of the blocking device; and controlling the locking device based upon a sensed position of the blocking device.

16. A method according to claim 15, further comprising sensing a position of the bolt; and wherein controlling also comprises controlling the locking device based upon a sensed bolt position.

17. A method according to claim 16, wherein the vehicle comprises a multiplexed bus; and wherein controlling also comprises controlling the locking device based on information received from the multiplexed bus.

18. A method according to claim 17, wherein the information comprises at least one of information on vehicle speed, a state of the engine, and on detection of an impact.

19. A method according to claim 15, wherein the locking device comprises a mechanical part carrying the bolt; wherein the blocking device comprises a solenoid coil and a core movable therein; wherein in a steering unlocking phase, the core is in a stable equilibrium position with no current in the solenoid coil and is biased in front of the mechanical part to block displacement of the bolt; and wherein in a steering locking phase, the core retracts based on current in the solenoid coil to free displacement of the bolt towards the steering column and the core is retained mechanically by the mechanical part even with no current in the solenoid coil.

* * * * *